United States Patent [19]

DiFrancesca et al.

[11] Patent Number: 4,925,149

[45] Date of Patent: May 15, 1990

[54] SHOCK ABSORBING UNIT

[76] Inventors: Peter DiFrancesca, 25 Ringler Dr., East Northport, N.Y. 11731; Richard O'Connor, 75 Edgewood Ave., Smithtown, N.Y. 11787

[21] Appl. No.: 341,499

[22] Filed: Apr. 21, 1989

[51] Int. Cl.⁵ .................... F16M 13/00

[52] U.S. Cl. .................... 248/687; 24/17 B; 206/320; 206/586; 248/345.1

[58] Field of Search .................... 248/345.1, 359 R, 359.1, 248/634, 176, 102, 1 B, 687; 24/17 B, 300, 301; 206/320, 523, 586

[56] References Cited

U.S. PATENT DOCUMENTS

| | | | |
|---|---|---|---|
| 853,393 | 5/1907 | Albaugh | 248/359.1 X |
| 1,167,719 | 1/1916 | Saulmon | 24/17 B |
| 3,363,749 | 1/1968 | Tinapple | 206/320 |
| 4,113,096 | 9/1978 | Scott | 206/586 X |
| 4,122,946 | 10/1978 | Holley | 206/523 |
| 4,686,745 | 8/1987 | Butler | 24/17 B |
| 4,733,776 | 3/1988 | Ward | 206/523 X |
| 4,762,227 | 8/1988 | Patterson | 206/523 X |
| 4,824,059 | 4/1989 | Butler | 206/523 X |

*Primary Examiner*—David L. Talbott

[57] ABSTRACT

The present invention relates to a new and novel device constructed so as to prevent damage to a manually operated remote control device capable of controlling the operation of a television or other electronic equipment, the shock absorbing unit being of unitary construction having at both of its ends identical cavity structures capable of encapsulating the ends of a manually operated remote control device, the cavity structures being affixed to a singular band member resulting in there being provided shock absorbing means about all surfaces of the manually operated remote control device thereby protecting same from damage.

7 Claims, 2 Drawing Sheets

SHOCK ABSORBING UNIT

BACKGROUND AND OBJECTS OF THE INVENTION

The present invention directs itself to a new and novel design and structure for a shock absorbing unit capable of utilization with a manually operated remote control device utilized in conjunction with present day television and/or other electronic equipment.

Although prior art devices exist that address themselves to various structures that are capable of providing some form of shock absorbing feature to external impact as related to a device enclosed therein, nothing set forth in the prior art relates to the novel design nor structure of the present device. Additionally, the present invention relates to a novel design that provides unique advantages in achieving the overall aspects of the invention while overcoming a number of disadvantages inherent in the prior art.

It is, therefore, an object of the present invention to create a new and novel design for a shock absorbing unit capable of providing protection against damage to a manually operated remote control device that overcomes the various problems and disadvantages inherent in prior art devices.

It is another object of the present invention to create a new and novel design for a shock absorbing unit capable of providing protection against damage to a manually operated remote control device wherein said shock absorbing unit is capable of adjustment in its overall length so as to allow for applicability to various sized manually operated remote control devices.

It is another object of the present invention to create a new and novel design for a shock absorbing unit capable of providing protection against damage to a manually operated remote control device wherein said shock absorbing unit is capable of adjustment in its overall length so as to allow for applicability to various sized manually operated remote control devices.

It is another object of the present invention to create a new and novel design for a shock absorbing unit capable of providing protection against damage to a manually operated remote control device wherein said shock absorbing unit provides omni directional protection to said manually operated remote control device.

It is another object of the present invention to create a new and novel design for a shock absorbing unit capable of providing protection against damage to a manually operated remote control device wherein said shock absorbing unit allows for the unencumbered utilization of said manually operated remote control device while providing said shock absorbing capability.

The objections and advantages of the invention are set forth in part herein and in part will be obvious herefrom, or may be learned by practice of the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

This invention relates to a novel design for a shock absorbing unit capable of utilization in conjunction with a manually operated remote control device commonly available in conjunction with televisions and other electronic equipment.

In keeping with the invention, said shock absorbing unit is constructed so as to prevent damage to a manually operated remote control device capable of controlling the operation of a television, the shock absorbing unit being of unitary construction having at both of its ends identical cavity structures capable of encapsulating the ends of a manually operated remote control device, the cavity structures being affixed to a singular band member resulting in there being provided shock absorbing means about all surfaces of the manually operated remote control device thereby protecting same from damage.

It will be understood that the foregoing general description and the following detailed description as well are exemplary and explanatory of the invention, but are not restrictive thereof.

The accompanying drawings referred to herein and constituting a part hereof, are illustrative of the invention but not restrictive thereof, and, together with the description, serve to explain the principles of the invention.

DESCRIPTION OF A PREFERRED EMBODIMENT

Figure 1:
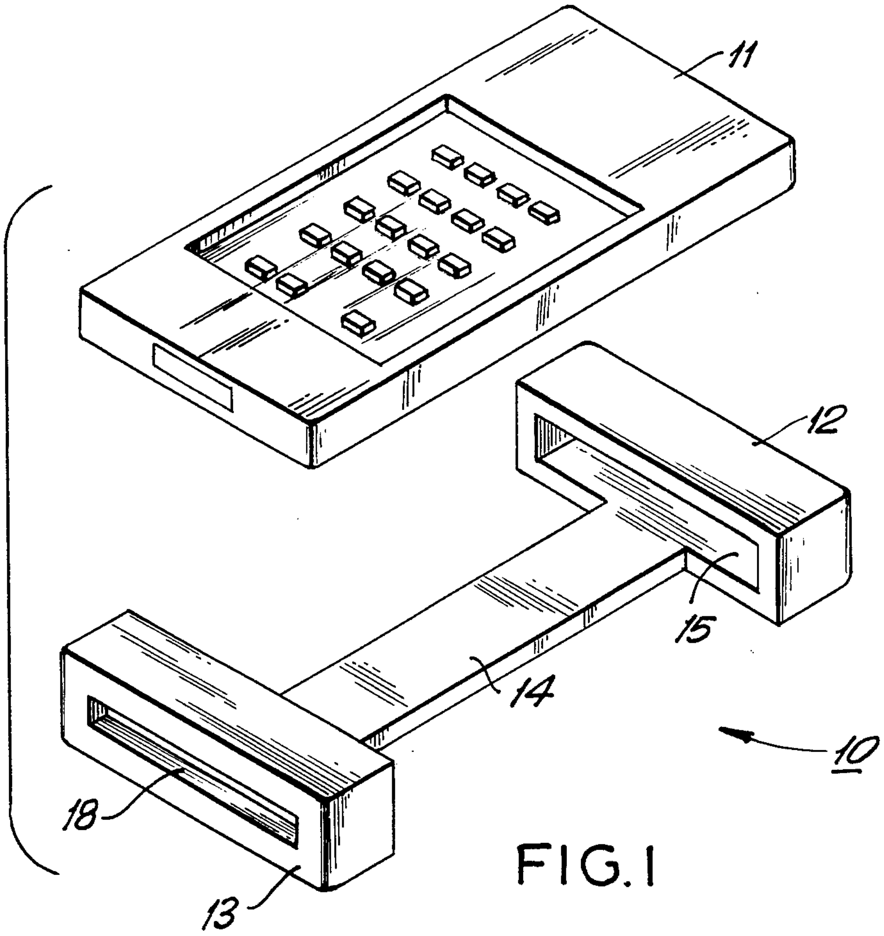
FIG. 1 is a three dimensional perspective view of a shock absorbing unit constructed in accordance with the invention wherein there is additionally illustrated in a three dimensional perspective view a remote control device.

Reference is herein made to FIG. 1 wherein there is depicted a shock absorbing unit 10 constructed in accordance with the invention along with manually operated remote control device 11.

As therein depicted, it should be noted that manually operated remote control device 11 is an item well-known within the prior art, is readily available throughout the electric industry and is depicted therein merely to be illustrative of the invention, same being utilized in conjunction with televisions and/or other electronic equipment whereby through the utilization of said manually operated remote control device 11, a television may be remotely turned on or off, channel selections can be remotely actuated, sound volume can be remotely raised or lower, and the like.

As is inherent in such devices as said manually operated remote control device 11, damage can occur to their electronic functioning as a result of impact and/or shock occurring to the structure resulting from same being dropped or striking other objects.

As depicted in FIG. 1, shock absorbing unit 10 is of unitary structure, but comprised of three component elements, to wit, cavity structure 12, cavity structure 13 and band member 14.

More particularly, as illustrated in FIG. 1 and as depicted in the preferred embodiment therein illustrated, housing structure 12 and housing structure 13 are identical in design and/or dimensions, are rectangular in shape and each define a rectangular cavity capable of having inserted therein the respective ends of manually operated remote control device 11.

More particularly, housing structure 12 defines internal cavity 15 and housing structure 13 defines internal cavity 16. It should be noted that internal cavity 15 and internal cavity 16 are of dimensions capable of receiving in mechanical interfit therewith the ends of manually operated remote control device 11. Reference is made to FIGS. 2 through 5 wherein there is illustrated said interfit between manually operated remote control device 11 and internal cavity 15 and internal cavity 16 of shock absorbing unit 10.

Figure 5:
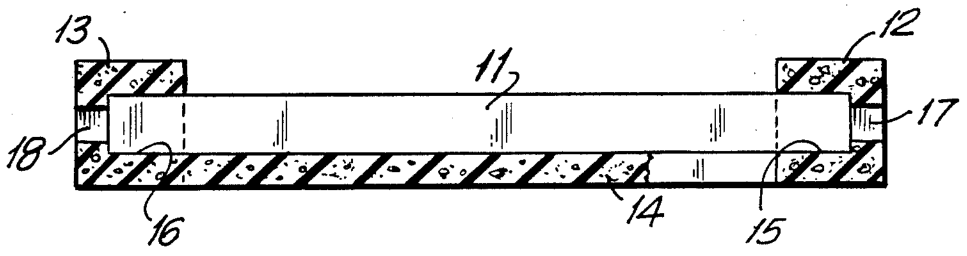
FIG. 5 is a cross-sectional view taken along line 5—5 of FIG. 3.

Additionally, there is formed an opening 17 within the wall structure of housing structure 12 as well as a comparable opening 18 within the wall structure of housing structure 13 as is best illustrated in FIG. 5. It should be noted that in the preferred embodiment opening 17 and opening 18 are rectangular in shape and are formed through said wall structure of housing structure 12 and housing structure 13 respectively so as to allow for the generated electronic signal from manually operated remote control device 11 to emanate from manually operated remote control device 11 without being obstructed by the structure of shock absorbing unit 10.

In keeping with the invention, it should further be noted that band member 14 structurally connects housing structure 12 to housing structure 13 so as to define a singular and otherwise unitary structure for shock absorbing unit 10.

Furthermore, the preferred embodiment of shock absorbing unit 10 as illustrated in the drawings is such as to be fabricated from any one of a number of materials and/or composition of materials well known in the prior art, the preferred material for purposes of illustration herein being that of foam rubber. Nothing herein should be construed, however, to so limit the scope of the invention as to having same constructed from foam rubber, it being within the scope of this invention to have shock absorbing unit 10 fashioned from any material well known in the prior art that is capable of having elasticity to it as well as capable of absorbing external force and to dampen same.

Furthermore, it should additionally be noted that due to the fact that the material utilized to construct shock absorbing unit 10 is of a material that evidences properties of elasticity, band member 14 is capable of being stretched along its length much like a rubber band so as to lengthen the distance between housing structure 12 and housing structure 13 such that shock absorbing unit 10 is capable of applicability to a variety of manually operated remote control devices 11 since, in effect, shock absorbing unit 10 can adjust itself to various lengths associated with various lengths of manually operated remote control device 11.

Similarly, due to the fact that housing structure 12 and housing structure 13 of shock absorbing unit 10 are also fashioned from material that evidences elasticity, there is achieved the capability to cause internal cavity 15 and internal cavity 16 of housing structure 12 and housing structure 13 respectively, to in effect be adjustable to allow for interfit with the respective ends of manually operated remote control device 11 as related to a variety of variations in dimensions associated with the ends of manually operated remote control devices presently on the market.

Figure 2:
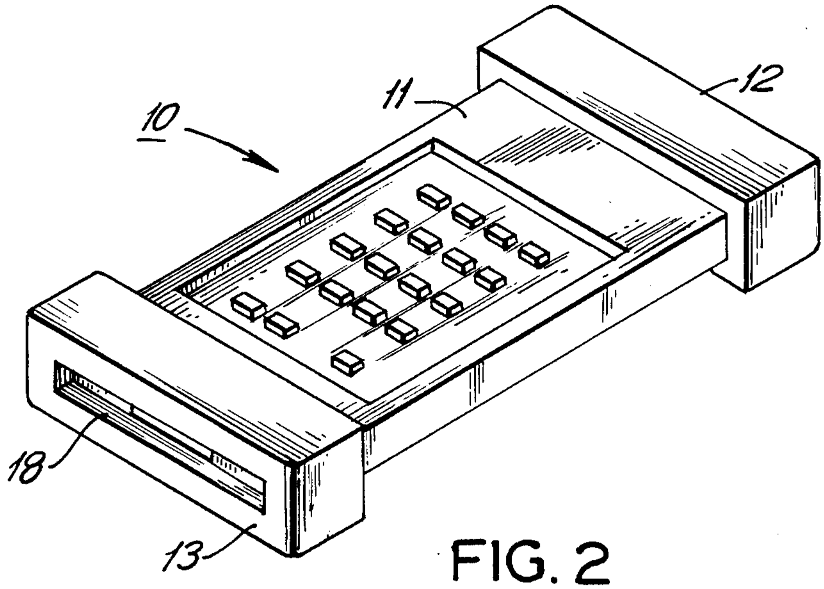
FIG. 2 is a three dimensional perspective view of a shock absorbing unit constructed in accordance with the invention as it encapsulates a manually operated remote control device.

Additionally, as a further feature of shock absorbing unit 10 as illustrated in the drawings and in keeping with the invention, because of the elasticity of the material shock absorbing unit 10 is fashioned from and because of the unique structure and interrelationship of the component parts thereof, there is achieved a firm interfit between the manually operated remote control device 11 that is to receive the shock absorbing protection from shock absorbing unit 10 and shock absorbing unit 10 such that manually operated remote control device 11 does not move within the structure of shock absorbing unit 10 once shock absorbing unit 10 is structurally affixed about manually operated remote control device 11 reference to FIG. 2 being herein made as illustrative of same.

Figure 3:
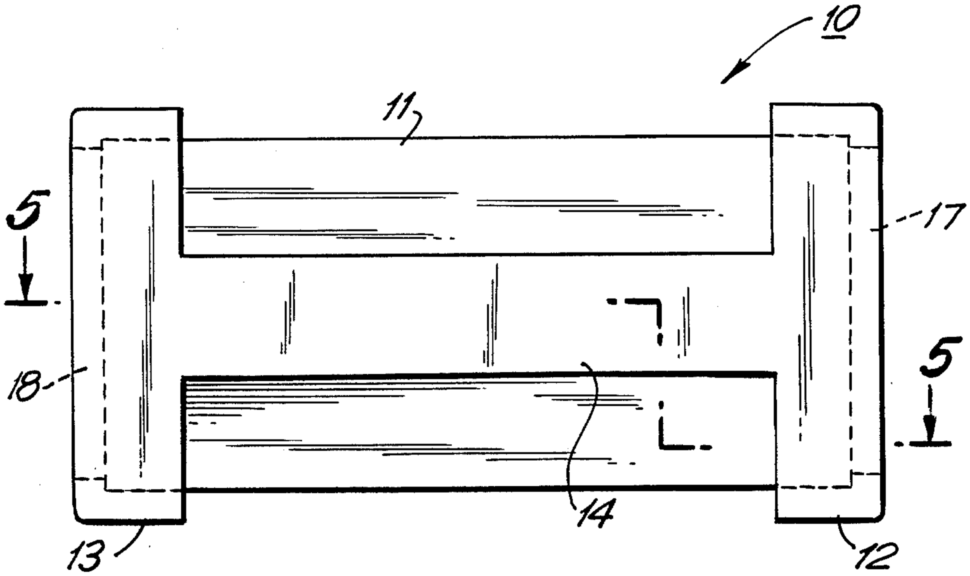
FIG. 3 is a bottom view of a shock absorbing unit encapsulating the manually operated remote control device as depicted in FIG. 2.

In further keeping with the invention, reference is made to FIG. 3 wherein there is illustrated in bottom view of shock absorbing unit 10 with manually operated remote control device 11 placed therein in accordance with said invention, it being obvious from FIG. 3 that band member 14 provides an additional surface area of protection separate and apart from the external surface area of housing structure 12 and housing structure 13 as related to manually operated remote control device 11.

As further illustrated in FIG. 3, opening 17 and opening 18 are readily depicted.

Figure 4:
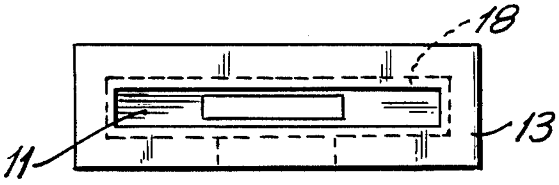
FIG. 4 is a left side view of a shock absorbing unit encapsulating the manually operated remote control device as depicted in FIG. 2.

With regard to FIG. 4, there is illustrated a left side view of shock absorbing unit 10 with manually operated remote control device 11 placed therein, same being a left side view of the combined components referred to above as illustrated in FIGURE 2 housing structure 13 being therein illustrated along with the end portion of manually operated remote control device 11 as it appears through opening 18 formed within the wall structure of housing structure 13.

As illustrated in FIG. 5, there is depicted a cross sectional view taken along lines 5—5 of FIG. 3 so as to illustrate in a sectional fashion manually operated remote control device 11 as it appears inserted within shock absorbing unit 10 in accordance with the invention, housing structure 12, housing structure 13 and band member 14 therein illustrating the surface protection provided as related to manually operated remote control device 11 along with there being formed illustrated opening 17 as formed through the wall structure of housing structure 12 and opening 18 as formed through the wall structure of housing structure 13.

As can be seen from the above description as well as upon review of the drawings, there is achieved and otherwise created a new and novel device constructed so as to prevent damage to any form of remote control device capable of controlling the operating of an item of electronic equipment, same being achieved in a unique fashion.

The preceding description and accompanying drawings relate primarily to a specific embodiment of the invention, and the invention in its broader aspects should not be so limited to one specific embodiment as herein shown and described, but departures may be made therefrom within the scope of the accompanying claims without departing from the principles of the invention and without sacrificing its chief advantages.

I claim:

1. An electronic remote control device and a shock absorbing unit capable of provided protection against external impact to an electronic remote control device wherein said shock absorbing unit comprises:

(a) a first housing structure defining a hollow cavity receiving in structural interfit one end of said electronic remote control device;

(b) a second housing structure defining a hollow cavity receiving in structural interfit the other end of said electronic remote control device;

(c) a band member structurally affixed to said first housing structure and said second housing structure so as to structurally connect same thereby resulting in there being defined in single unitary construction said first housing structure said second housing structure and said band member to receive and protect said electronic remote control device.

2. A shock absorbing unit as defined in claim 1 wherein said first housing structure defining a hollow cavity and said second housing structure defining a hollow cavity each define identical hollow cavities.

3. A shock absorbing unit as defined in claim 1 wherein said first housing structure defining a hollow cavity and said second housing structure defining a hollow cavity each define identical rectangular hollow cavities.

4. A shock absorbing unit as defined in claim 1 wherein said first housing structure defining a hollow cavity defines a further opening within the wall structure of said shock absorbing unit through the wall structure that is opposite to the open end of said hollow cavity formed by said first housing structure.

5. A shock absorbing unit as defined in claim 4 wherein said second housing structure defining a hollow cavity defines a further opening within the wall structure of said shock absorbing unit through the wall structure that is opposite to the open end of said hollow cavity formed by said second housing structure.

6. A shock absorbing unit as defined in claim 1 wherein said first housing structure defining a hollow cavity and said second housing structure defining a hollow cavity and said band member are made of material that evidences elastic properties.

7. A shock absorbing unit as defined in claim 6 wherein the composition of material of said shock absorbing unit is constructed from foam rubber.

* * * * *